United States Patent [19]

Andlid et al.

[11] E Re. 31,242

[45] Reissued May 17, 1983

[54] METAL WORKING EMULSION

[75] Inventors: Sune Andlíd; Lennart Lindén, both of Karlshamn, Sweden

[73] Assignee: AB Karlshamns Oljefabriker, Karlshamn, Sweden

[21] Appl. No.: 285,295

[22] Filed: Jul. 20, 1981

Related U.S. Patent Documents

Reissue of:

[64] Patent No.: 4,237,021
Issued: Dec. 2, 1980
Appl. No.: 17,084
Filed: Mar. 5, 1979

[30] Foreign Application Priority Data

Mar. 7, 1978 [SE] Sweden ..... 7802533

[51] Int. Cl.[3] ..... C10M 1/06

[52] U.S. Cl. ..... 252/49.5; 72/42; 252/42

[58] Field of Search ..... 252/49.5, 42; 72/42

[56] References Cited

U.S. PATENT DOCUMENTS

| | | | |
|---|---|---|---|
| 2,238,478 | 4/1941 | Ott | 252/49.5 X |
| 2,896,486 | 7/1959 | Donnelly | 252/49.5 X |
| 2,948,681 | 8/1960 | Milberger et al. | 252/49.5 X |
| 3,278,430 | 10/1966 | Williams | 252/49.5 X |
| 3,311,557 | 3/1967 | Schiermeier et al. | 252/49.5 X |
| 3,492,815 | 2/1969 | Drake | 252/49.5 |
| 3,835,052 | 9/1974 | McDole et al. | 252/49.5 |

OTHER PUBLICATIONS

Bastian, E. L. H., "Metalworking Lubricants", pp. 14, 17, 18, 26 and 27, 1951.

*Primary Examiner*—Andrew Metz
*Attorney, Agent, or Firm*—Davis, Hoxie, Faithfull & Hapgood

[57] ABSTRACT

Metal working emulsion of the type oil-in-water, with good stability and unlimited dilutability, intended for use at deforming metal working, mainly machining by detachment of cuttings, but also suitable for deepdrawing and rolling. The emulsion is based on triglyceride oils and components of these. The emulsifying system consists of fatty acid monoglycerides and alkali soaps of fatty acids. The cooling and lubricating properties are further increased by the addition of fatty acids and an alkanolamine or fatty amine.

21 Claims, No Drawings

METAL WORKING EMULSION

Matter enclosed in heavy brackets [ ] appears in the original patent but forms no part of this reissue specification; matter printed in italics indicates the additions made by reissue.

This invention relates to an emulsion with lubricating and cooling abilities, intended for use at deforming metal working, mainly machining by detachment of cuttings, but also suitable for deepdrawing and rolling.

In machining by detachment of cuttings like drilling, turning, milling, tapping and grinding, cutting fluids based on mineral oil products are usually used, mainly because of the relative cheapness of the mineral oils. In most cases, they consist of water emulsions, and to meet the requirements of the metal working industry, a long list of additives are used, e.g. EP-additives to improve lubrication (EP=Extreme Pressure).

In recent years increased attention to working environments and industrial safety has created the need for a new type of metal working fluid. Unsatisfactory working environments and accompanying medical complaints are common problems with the products used in the metal working industry today. The mineral oil-based products produce oil smoke and oil mist at the working premises, as well as fouling in and around the machines. The mineral oil and the additives used can cause irritation of the skin, eczema and allergic reactions. Risk of cancer is present, [or] *on* prolonged skin exposure, and risk of lung damage is present on inhalation of the oil smoke and the oil mist. Lately there have been several reports on the presence of carcinogenic substances in cutting fluids. Mineral oils contain polyaromatic hydrocarbons, e.g., benzopyrenes. Because of the high temperatures in the cutting zone, it is also probable that polyaromatic compounds are formed when the products are used.

Environmental control legislation imposes heavy requirements on the metal working industry's handling of waste water. The technology of purifying spent emulsions and degreasing baths has grown complicated, because product development has resulted in the use of more and more additives and more stable emulsifier systems. Consequently the treatment of spent cutting fluids, mainly emulsions, has become very troublesome and expensive.

Smaller companies have to use specialized waste disposal services and only the largest companies have their own emulsion breaking plants, which however don't always function satisfactorily. The breaking of the emulsions results in a water phase, which has to be treated further in conventional sewage treatment plants, and an oil containing sludge, which has to be disposed of, or at the best is usable as a fuel. A reuse of the oil is not an alternative. Consequently the industry is very much in need of a new type of cutting fluid, and the requirements on such a fluid are extensive:

- to have minimal detrimental effect on man and the environment,
- to form very little oil smoke and oil mist,
- facilitate an easy waste treatment without disposal problems,
- to be uncomplicated in composition and with few additives, and
- to be resistant to attack by micro-organisms.

Fatty oils, i.e. vegetable or animal oils and fats, are by function suitable raw materials for lubricants, and have earlier been used extensively before the cheaper mineral oils came to completely dominate the market. Contrary to mineral oils, fatty oils are renewable, proenvironmental and can be completely broken down biologically.

For metal cutting or grinding, it is generally advantageous to use a cutting fluid in the form of a water-containing emulsion of the oil-in-water type, through which an improved cooling effect is achieved at the same time as the lubricating effect of the oil part is retained. Also, from an economic point of view, a water emulsion is considerably more favourable.

These emulsions can be prepared in ready-to-use concentrations, but from transportation and handling aspects it is more suitable to first prepare a concentrate, which later can be diluted with water by the user—the metal working industry.

The requirements for such a concentrated emulsion are that the stability should be very good, that it should be easily and unlimitedly dilutable with water, and that it should be stable as an emulsion even when diluted. To be able to manufacture such an emulsion, one has to use special emulsifiers (surface active agents). Strong synthetic surfactants may be used, but because of the health and environmental problems, referred to above, these should be avoided.

The object of this invention is to prepare a metal working emulsion, of the oil-in-water type, based on triglyceride oils, which is adequately stable, which can be unlimitedly diluted, and which at the same time has sufficiently good and lubricating properties, compared to those products used today, without having their undesirable environmental and health aspects.

We have found that, surprisingly, starting from triglyceride oils, one can prepare an emulsion which fulfills the requirements of stability and dilutability with aid of an emulsifying system comprising fatty acid monoglycerides and alkali soaps of fatty acids. By using only "natural" and completely harmless components the requirements of the product from environmental aspects are fulfilled.

To bring the lubricating and cooling properties of the emulsion to the level of the mineral oil based products, however, additional components are required.

We have found that the use of an organic amine, such as an alkanolamine, e.g. triethanolamine, or a fatty amine, considerably increases the wetting properties of the emulsion and, thereby, its cooling effect. It has further been shown, that the addition of free fatty acid to the glyceride oil increases its lubricating properties. In fact, the amine and the fatty acid are believed to be present in the emulsion mainly as their salts, i.e. as soaps.

The present invention is thus a metal working emulsion consisting essentially of an oil phase dispersed in a continuous water phase wherein the oil phase comprises:

- 0.5–50 parts by weight of triglyceride oil,
- 0.1–10 parts by weight of fatty acid monoglyceride,
- 0.05–10 parts by weight of a fatty acid, and
- 0.05–10 parts by weight of an alkanolamine or a fatty amine;

and the water phase comprises:

- 0.05–3 parts by weight of an alkali soap of fatty acids, and
- 45–98 parts by weight of water.

The larger amounts of fatty components are used when preparing the emulsion concentrates, which, as mentioned earlier are usually prepared at the [manufacturers] *manufacturer's* plant, and the lower amounts are used when preparing the ready-to-use emulsions.

When preparing the oil phase the fatty acid monoglyceride, the fatty acid and the amine are dissolved in the triglyceride oil at a temperature of 40°-70° C. The water phase is prepared by dissolving the alkali soap at a temperature of 20°-70° C., preferably at 20°-40° C.

The oil phase is slowly mixed into the water phase, while stirring, at a temperature of 20°-50° C.

For the preparation of the ready-to-use emulsions it is thereafter enough with just powerful agitation to obtain a stable emulsion, while for the preparation of the emulsion concentrate, homogenization of the product is usually required. The homogenization is preferably carried out at a temperature of 40°-60° C. in a conventional homogenizer.

The triglyceride oil may be animal or vegetable oil, or oil mixture, which has a solidifying point low enough to allow a convenient handling of the emulsion in the concentrated as well as the ready-to-use form, but which at the same time is mainly free from fatty acids like linolenic acid to avoid oxidation and polymerisation difficulties. The oil should therefore be preferably liquid at room temperature, and have an oleic acid content of at least 40%. Especially suitable oils, from a functional point of view, are olive oil, peanut oil and lobra oil (rapeseed oil with a low content of erucic acid). Also the lowest melting fractions of fractionated fats, like e.g. "palm olein", have been found excellent for this purpose.

The fatty acid monoglyceride should be of the so called "soft product" type, i.e. have a melting point below 60° C. The best product is pure oleic acid monoglyceride, (mono-oleoglycerol), but also other commercial products can be used, as Dimodan S, a molecular distilled monoglyceride manufactured by Grindstedvaerket, Denmark, from edible, refined lard, with an approximate fatty acid composition of 30% palmitic acid, 18% stearic acid and 40% oleic acid.

It is also possible to use the so called technical monoglycerides, manufactured through glycerolysis (glycerolesterification) of e.g. lobra oil. Such products, with a content of 40-60% monoglycerides, are easy to manufacture without complicated equipment, and therefore of interest. Of course, if such products are used, the ratio between triglyceride oil to glycerolysis product must be adjusted so that the content of monoglyceride in the emulsion is correct. The oil soluble monoglyceride is used, primarily because of its surface active properties, as the lipophilic component of the emulsion system.

The surface activity also imparts a wetting effect, through which the lubricating effect of the oil increases.

The fatty acid is preferably oleic acid. The requirements on this component are the same as on the oil and the monoglyceride: to be liquid at room temperature, that is to have a titer lower than 25° C., and not to contain substantial quantities of more unsaturated homologues.

The fatty acid has shown to increase the lubricating effect substantially. The presence of fatty acid prevents the formation of odor at more severe machining operations, which is believed partly to result from the fatty acid's improvement of the lubricating effect and partly to be connected with the formation of soaps of amine and fatty acid.

As alkanolamine, an amine with 2-4 carbon atoms in the alkanol-part is preferred. Especially suitable is triethanolamine, which as well as having good wetting and rust-preventing properties, also has the advantage of being dermatologically harmless, which is also evident in its wide use in cosmetic preparations.

The amine can also be based on fatty raw materials, whereby the same good wetting and rust-preventing properties can be achieved. Suitably a fatty amine with 8 to 18 carbon atoms in the carbon chain can be used; especially suitable is dodecylamine.

The fatty acid soap is suitably a sodium- or potassium salt of a fatty acid with 12-22 carbon atoms, usually 16 or 18 carbon atoms (palmitic- or stearic acid). Potassium stearate gives slightly better results than does sodium stearate, but if stearic soaps are to be used, de-ionized water must be used to prevent flocculation of calcium- and magnesium soaps. When using oleic acid soaps (sodium or potassium) this problem is fully avoided, although when manufacturing the concentrate it is advisable to use de-ionized water.

In metal working operations with very heavy contact pressure, the lubricating properties of the metal working emulsion can, if needed, be further increased by adding a slightly chlorinated and/or sulfurized triglyceride oil. These components are well compatible with the metal working emulsion according to the invention. Preferably 20-40% of the triglyceride oil is replaced by such components at extremely heavy operations.

To prevent problems with oxidation and polymerization an antioxidant can possibly be added. Suitable antioxidants are butyl hydroxyanisole, BHA, and butyl hydroxytoluene, BHT. Advantageously e.g. Eastman Kodak's products Tenox 2 or Tenox 6 can be used. These agents are suitably added in an amount of 0.1-1.0 percent by weight [of] *to* the concentrated emulsion.

Under the unfavorable conditions encountered in the workshop environment, attack by micro-organisms can easily take place. If these micro-organisms are allowed to develop uncontrolled for a sufficiently long time, an unpleasant odor may develop. Also, the corrosion inhibiting properties of the emulsion may decrease through the formation of acid degradation products in the same way as takes place when using traditional mineral oil based products. This is avoided by adding a bacteria controlling agent to the metal working emulsion. A formaldehyde releasing agent can be used e.g. Grotan BK, which is manufactured by Schülke & Mayr GmbH.

Thus, the product manufactured according to the invention offered from the user's point of view a long list of advantages:

The product is completely based on fatty oils or components of these. These oils are renewable, proenvironmental and bio-degradable.

The occurrence of skin irritation, eczema and allergic reactions can considerably be reduced, and the risk of cancer be removed.

Because of the higher molecular weight of the triglyceride oils, and the considerably higher vapor pressure in connection therewith, no troublesome oil smoke will be formed. Generally this means a considerably cleaner working environment.

Products based on fatty oils present no difficulty from the standpoint of waste treatment. By using known proper separation techniques the fatty phase can easily be separated, and the remaining water doesn't require any special cleaning before discharge. The fatty phase can easily be separated by hydrolysis with known techniques, and the recovered fatty acids can be reused.

The invention is further illustrated by the following examples:

EXAMPLE 1

Preparation of a metal working emulsion in concentrated form.

Oil Phase:

34.7 parts by weight of palm olein
4.9 parts by weight of monoglyceride Dimodan S
2.7 parts by weight of rapeseed fatty acids
2.7 parts by weight of triethanolamine Water phase:

1.1 parts by weight of sodium oleate
55.0 parts by weight of de-ionized water

The palm olein was a low melting fraction of palm oil. The content of oleic acid in the palm olein was 50%.

The components of the oil phase were mixed at 60°-70° C. The soap was dissolved in water at 25° C., after which the oil phase was added slowly and while stirring to the water phase. The dispersion so obtained was thereafer homogenized at 50° C. in a homogenizer of conventional type.

The emulsion concentrate could be diluted easily and unlimitedly with water of various hardness (0-12 dH). Both the emulsion concentrate and the diluted emulsions were stable during storage, i.e., the oil not having a tendency to separate.

The product was tested in a dilution 1:10 in a multiple-spindle drilling machine in production, where the working operation was tapping in aluminum. After 1 month of working the function of the emulsion was unchanged, and completely comparable with the function of a conventional mineral oil based emulsion.

EXAMPLE 2

A metal working emulsion was prepared for testing in a heavy loaded numerically controlled automatic lathe. Many iron-metals, e.g. cast iron and hardened tool-steel were worked by tools with a cutting edge of hard metal. The metal working emulsion was prepared as follows:

Oil phase:

27.9 parts by weight of rapeseed oil
11.7 parts by weight of technical monoglyceride from rapeseed oil
2.7 parts by weight of rapeseed fatty acids
2.7 parts by weight of triethanolamine
0.4 parts by weight of an antioxidant, Tenox 6

Water phase:

1.1 parts by weight of sodium oleate
55.0 parts by weight of de-ionized water

The rapeseed oil was of the low erucic acid type with an oleic acid content of 52%. The technical monoglyceride had a content of 40% actual monoglyceride. The components in the oil phase were mixed at a temperature of 40°-50° C. Thereafter the oil phase was added slowly, while stirring, to the water phase. The dispersion obtained was homogenized at 50° C. in a conventional homogenizer equipment.

The emulsion concentrate obtained in this way was diluted 1:15 in tap water and tested in an automatic lathe. After 3 months of running the function of the metal working emulsion was unchanged. The worked parts showed no tendencies of corrosion. The metal working emulsion caused no drying coatings; on the contrary, the machine surfaces were very easy to keep clean.

EXAMPLE 3

This example is intended to illustrate the improved lubricating effect imparted to the emulsion by the fatty acid.

Two metal working emulsions in ready-to-use concentration were prepared for testing in a cylinder-grinding machine. The metal working emulsions were prepared from the following components:

| Sample A | Parts by Weight |
|---|---|
| Oil Phase: | |
| rapeseed oil | 2.00 |
| technical monoglyceride from rapeseed oil | 0.78 |
| triethanolamine | 0.18 |
| Water Phase: | |
| sodium stearate | 0.10 |
| de-ionized water 97 | |

| Sample B | Parts by Weight |
|---|---|
| Oil Phase: | |
| rapeseed oil | 1.80 |
| technical monoglyceride from rapeseed oil | 0.78 |
| rapeseed fatty acid | 0.20 |
| triethanolamine | 0.18 |
| Water Phase: | |
| sodium stearate | 0.10 |
| de-ionized water 97 | |

The rapeseed oil was of the low erucic acid type with an oleic acid content of 60%. The technical monoglyceride had a content of 40% actual monoglyceride.

The components in the oil phase were mixed at 40°-50° C., and the sodium stearate was dissolved in the water phase at 60°-70° C. Thereafter the oil phase was added slowly to the water phase while stirring intensively, whereby a stable emulsion was obtained.

The metal working emulsions prepared in this way were tested in a cylinder-grinding machine by working hardened tool-steel. It was found that regarding the surface fineness of the material, as well as the relative wear of the abrasive wheel, sample B (with fatty acid addition) have better results than sample A (without fatty acid addition). On the average, the surface fineness was 10% better and the relative wear of the abrasive wheel 30% lower with sample B than with sample A. The results were completely comparable with those obtained when using conventional mineral oil based emulsions without EP-additives.

EXAMPLE 4

This example is intended to illustrate the improved wetting function obtained by adding triethanolamine to the emulsion.

Two emulsion samples were prepared according to the same process as in Example 3;

| Sample A | Parts by Weight |
|---|---|
| Oil Phase: | |
| rapeseed oil | 3.50 |
| monoglyceride of oleic acid | 1.00 |
| triethanolamine | 0.50 |
| Water Phase: | |
| sodium stearate | 0.10 |
| de-ionized water 95 | |

-continued

| Sample B | Parts by Weight |
|---|---|
| Oil Phase: | |
| rapeseed oil | 4.00 |
| monoglyceride of oleic acid | 1.00 |
| Water Phase: | |
| sodium stearate | 0.10 |
| de-ionized water 95 | |

The rapeseed oil was of the low erucic acid type with an oleic acid content of 60%.

Measurements were made of the wetting capacity of these emulsions on steel surfaces. It was hereby found that emulsion sample B (without triethanolamine) gave a wetting angle of 40°-45°, and emulsion sample A (with triethanolamine) gave a wetting angle of 15°-20°. This latter result was even somewhat better than what is obtained with conventional mineral oil based emulsions.

EXAMPLE 5

A metal working emulsion was prepared according to Example 1 with the following ingredients:

Oil phase:

34.3 parts by weight of palm olein
4.8 parts by weight of monoglyceride Dimodan S
2.7 parts of weight of rapeseed fatty acids
5.4 parts by weight of triethanolamine Water phase:

1.1 parts by weight of sodium oleate
55.0 parts by weight of de-ionized water

The metal working emulsion was tested for a longer period of time in a numerically controlled machine tool for drilling and tapping. In the machine toughened steel was worked with high speed tools.

The machining results were compared to those obtained when a conventional cutting fluid of the emulsion type with EP-additives was used. The conventional cutting fluid was especially intended for heavy machining like drilling, tapping, thread cutting and deep drawing in different iron materials. Both cutting fluids were used in the same dilution, about 15 times, with ordinary tap water.

The surface smoothness of the worked parts was equal for the conventional cutting fluid and for the cutting fluid according to this invention. The lifetime of the tools for the drilling operation was equally good. For the tapping operation the lifetime with the cutting fluid according to this invention was even somewhat better than with the conventional cutting fluid.

We claim:

1. A metal working emulsion with good stability and unlimited dilutability for deforming metalworking, including machining by detachment of cuttings, deep-drawing and rolling, comprising an oil phase which is dispersed in a continuous water phase;

the oil phase comprising 0.5-50 parts by weight of triglyceride oil,
0.1-10 parts by weight of fatty acid monoglyceride,
0.05-10 parts by weight of fatty acid, and
0.05-10 parts by weight of alkanolamine or fatty amine;

and the water phase comprising 0.05-3 parts by weight of alkali soaps of fatty acids, and
45-98 parts by weight of water.

2. A metal working emulsion according to claim 1 in concentrated form, wherein the oil phase comprises 15-50 parts by weight of triglyceride oil,
2-10 parts by weight of fatty acid monoglyceride,
1-10 parts by weight of fatty acid, and
1-10 parts by weight of alkanolamine or fatty amine;

and the water phase comprises 0.05-3 parts by weight of alkali soaps of fatty acids, and
45-60 parts by weight of water.

3. A metal working emulsion according to claim 1 in a ready-to-use form, wherein the oil phase comprises 0.5-10 parts by weight of triglyceride oil,
0.1-2 parts by weight of fatty acid monoglyceride,
0.05-2 parts by weight of fatty acid, and
0.05-1 parts by weight of alkanolamine or fatty amine;

and the water phase comprises 0.05-0.5 parts by weight of alkali soaps of fatty acids, and
90-98 parts by weight of water.

4. A metal working emulsion according to claim 1, wherein the triglyceride oil is a fatty oil, liquid at room temperature and having an oleic acid content of at least 45% by weight.

5. A metal working emulsion according to claim 1 wherein the fatty acids in the fatty acid monoglyceride are fatty acids with 16 to 18 carbon atoms, at least 40% by weight being oleic acid.

6. A metal working emulsion according to claim 5, wherein the fatty acid monoglyceride is oleic acid monoglyceride.

7. A metal working emulsion according to claim 1, wherein the fatty acid monoglyceride is a technical grade fatty acid monoglyceride obtained through esterification of a triglyceride oil with glycerol.

8. A metal working emulsion according to claim 1, wherein the fatty acid has a titer lower than 25° C.

9. A metal working emulsion according to claim 8, wherein the fatty acid is oleic acid.

10. A metal working emulsion according to claim 1, wherein the alkanolamine is triethanolamine.

11. A metal working emulsion acording to claim 1 wherein the fatty amine is dodecyl amine.

12. A metal working emulsion according to claim 1, wherein the alkali soaps of the fatty acids are sodium soaps of fatty acids with a titer below 25° C.

13. A metal working emulsion according to claim 1, wherein the alkali soaps of the fatty acids are potassium soaps of fatty acids with a titer below 25° C.

14. A metal working emulsion according to claim 1 wherein the alkali soaps of the fatty acids are sodium oleate.

15. A metal working emulsion according to claim 1 wherein the alkali soaps of the fatty acids are potassium oleate.

16. A metal working emulsion according to claim 1, wherein 20-40% by weight of triglyceride oil is replaced by a high pressure additive consisting of a slightly chlorinated or sulfurized triglyceride oil.

17. A metal working emulsion according to claim 4 wherein the triglyceride oil is chosen from the group of olive oil, peanut oil and rapeseed oil of the low erucic acid type.

18. A metal working emulsion according to claim 4 wherein the triglyceride oil is the lowest melting fraction of a fractionated fat.

19. A metal working emulsion according to claim 4 wherein the triglyceride oil is the lowest melting fraction of a fractionated palm oil.

20. A metal working emulsion according to claim 4 wherein the triglyceride oil is the lowest melting fraction of a hydrogenated and fractionated vegetable oil.

21. A metal working emulsion according to claim 4 wherein the triglyceride oil is the lowest melting fraction of a fractionated animal fat.

* * * * *